United States Patent [19]

Fabricius

[11] 4,032,421

[45] June 28, 1977

[54] CLEANING OF FLUE GAS APPARATUS

[75] Inventor: Claus Fabricius, Allerod, Denmark

[73] Assignee: Guldager Electrolyse International & Cie, Basel, Switzerland

[22] Filed: Dec. 1, 1975

[21] Appl. No.: 636,602

[30] Foreign Application Priority Data

Dec. 3, 1974 Denmark .................. 6264/74

[52] U.S. Cl. .................. 204/196; 55/228; 204/197

[51] Int. Cl.² .................. C23F 13/00

[58] Field of Search .................. 55/10, 122, 89, 128, 55/228; 204/196, 197, 147, 148, 150; 423/242; 210/42

[56] References Cited

UNITED STATES PATENTS

| | | | |
|---|---|---|---|
| 2,057,579 | 10/1936 | Kurth | 55/228 |
| 2,744,863 | 5/1956 | Andrus | 204/197 |
| 2,843,217 | 7/1958 | Von Linde | 423/242 |
| 3,532,595 | 10/1970 | Arnesjo et al. | 55/73 |
| 3,746,629 | 7/1973 | Nishkata et al. | 204/197 |

Primary Examiner—Bernard Nozick
Attorney, Agent, or Firm—Burns, Doane, Swecker & Mathis

[57] ABSTRACT

A apparatus for the cleaning of flue gas utilizes water which is sprayed onto the gas from a number of nozzles to remove dust particles and various gaseous components from the flue gas. The water may be collected at the bottom of a container to be recycled through the system. An electrolytic treatment of the collected water renders the suspension noncorrosive. A heat-exchanger is provided in the apparatus to utilize a portion of the heat content of the flue gas which is transferred to the collected water.

4 Claims, 1 Drawing Figure

U.S. Patent
June 28, 1977
4,032,421
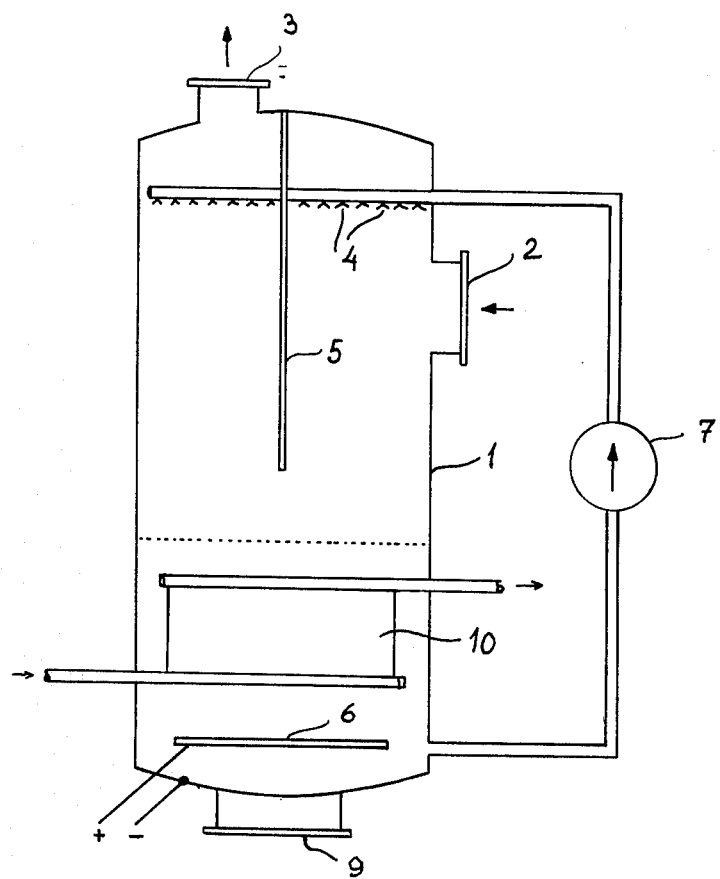

CLEANING OF FLUE GAS APPARATUS

The invention relates to a method for the cleaning of flue gas by the use of a gas-washer, and further to a plant incorporating a like gas-washer for the performance of the said method.

For the cleaning of flue gas from e.g. furnace installations the use of gas-washers or wet-process separators is known, whereby the flue gas is brought in contact with water from a number of nozzles. By this the waterdrops will intercept the dust particles in the gas and fall to the bottom of the gas-washer. In certain gas-washers it is moreover possible to obtain the removal of various gaseous components from the flue gas.

The sludge produced on the bottom of the gas-washer is the main reason why gas-washers for the cleaning of flue gas have not found any wide application.

The produced sludge is as a matter of fact highly corrosive, because the flue gas besides vapour contains i.a. $CO_2$, $CO$, $SO_2$, $SO_3$ and $N_2$. The receptacle of the gas-washer must thus be able to resist the acid residue and is therefore rather expensive. Problems may further arise by the draining off of the receptacle, as the sludge cannot unrestrictedly be directed into the sewer system.

The object of the invention is to devise a method for the cleaning of flue gas by the use of a gas-washer, which as the existing does not make heavy demands on the corrosion resistance of the receptacle material, and from which the accumulated sludge may be drained off without involving specific environment preserving precautions.

This is according to the invention achieved by subjecting the suspension on the bottom of the receptacle to an electrolytic process.

In a plant for the performance of the said method it is according to the invention preferable that at least the lower part of the receptacle in which the falling waterdrops accumulate constitutes the cathode of an electrolytic system, the anode of which is situated inside the receptacle somewhat above its bottom.

By the electrolytic treatment of the suspension accumulated on the bottom of the receptacle is achieved that the suspension becomes non-corrosive, so that the receptacle wall is not attacked, and that the sludge, which is to be drained off at regular intervals, does not contain substances which a conventional sewage cleaning plant cannot remove. The discharge may therefore take place direct into a sewer system.

As the suspension in the receptacle is non-corrosive it is possible according to the invention to place a heat-exchanger on the bottom of the receptacle. It is hereby practicable to reduce the ordinary flue waste considerably, because the heat of the flue gas to a great extent is given off. As the flue gas moreover has been considerably cleaned there is no risk involved by the lower flue temperature.

The invention will be further described below with reference to the drawing showing a vertical section of a plant according to the invention.

The plant shown incorporates a gas-washer with an e.g. cylindrical standing receptacle 1 in which the flue gas to be cleaned during the passage from an inlet branch 2 to an outlet branch 3 is sprinkled with water from a number of nozzles 4. To secure an intensive sprinkling there is between the two branch pipes 2,3 in the receptacle placed a wall or screen 5 forcing the flue gases to pass a substantial part of the receptacle. The water from the nozzles 4 intercepts the dust particles and certain gaseous components of the smoke and falls to the bottom of the receptacle.

A gas-washer of the said description in which the accumulated sludge on the bottom of the receptacle is very aggressive is generally known, and the inlet and outlet branches 2,3 may be otherwise situated if so desired.

The shown receptacle 1 constitutes in the plant according to the invention the cathode of an electrolytic system and is accordingly connected to the negative pole of a not shown d.c.-source, the positive pole of which is connected to an anode 6 situated in the lower section of the receptacle. The receptacle is filled up with a quantity of water, which by means of a circulation pump 7 can be carried to the nozzles 4, sufficient at least to cover the anode 6.

By the electrolytic treatment attained when the receptacle and the anode are exposed to a potential difference is achieved that the suspension becomes non-corrosive, whereby the bottom and wall of the receptacle is not attacked. This is due to the fact that ions of the anode material, e.g., aluminum, and radials form salts, e.g., aluminum sulfate, which are non-corrosive. It is likewise achieved that the sludge, which at regular intervals is drained off through a cleanout 9 in the bottom of the receptacle, does not contain substances, which cannot be removed in a conventional sewage cleaning plant. The sludge may thus be discharged direct into a sewer system.

In a preferred embodiment the receptacle is filled up with a quantity of water sufficient to cover not only the anode 6 but also a heat-exchanger 10 the inlet and outlet tubes of which are passing through the wall of the receptacle. As the suspension in the lower section of the receptacle is non-corrosive there is no risk involved by placing a heat-exchanger in the receptacle and thus permit the utilization of a considerable part of the heat contents of the flue gases, which is transferred to the falling water drops.

The devised plant will thus eliminate the problems hitherto existing in connection with the cleaning of flue gases in gas-washers due to the aggressivity of the sludge produced. It allows simultaneously the utilization of a substantial part of the heat contents of the flue gases without in the said connection requiring special precautions against corrosion of the heat-exchanger or against condensate in the flue.

I claim:

1. An apparatus for cleaning flue gas comprising:
   a conductive metal receptacle gas-washer including gas inlet means and gas outlet means establishing a path for flue gas to travel through the receptacle;
   a plurality of nozzles arranged within an upper region of said receptacle in a position for spraying flue gas traveling from said inlet means to said outlet means;
   conduit means for providing communication between a lower region of said receptacle and said nozzles;
   pumping means provided in said conduit means and operable to transport water from said lower region of said receptacle to said nozzles through said conduit means;
   electrolytic circuit means for treating suspensions in the lower region of said receptacle to render the suspensions noncorrosive, and comprising said conductive receptacle as a cathode and an anode disposed in said receptacle at the lower region thereof above its bottom, immersed in water, said anode and cathode being connected to a DC source; and discharge means for removing sludge from the lower region of said receptacle.

2. The apparatus of claim 1 including a heat exchanger in the lower region of the conductive receptacle to remove heat that has been absorbed from the flue gas by the water in the lower region of the receptacle.

3. The apparatus of claim 1 wherein a screen is provided within said conductive receptacle between said inlet means and said outlet means.

4. The apparatus of claim 1 wherein said anode is comprised of aluminum.

* * * * *